No. 878,860. PATENTED FEB. 11, 1908.
N. S. BÖK.
JOURNALING DEVICE.
APPLICATION FILED JULY 11, 1907.
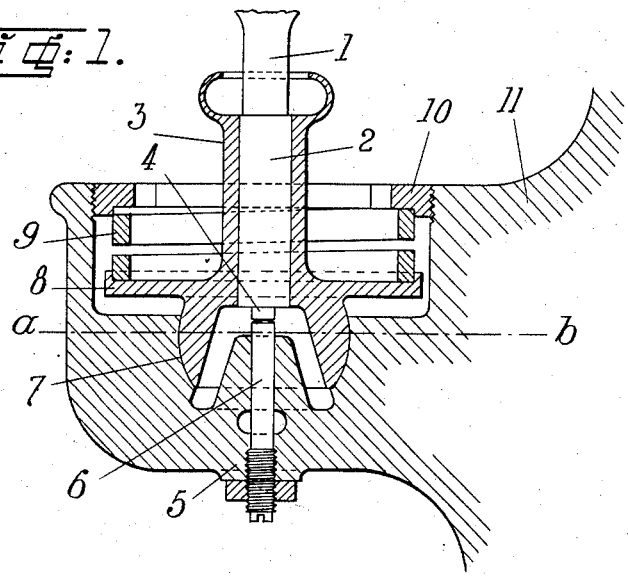
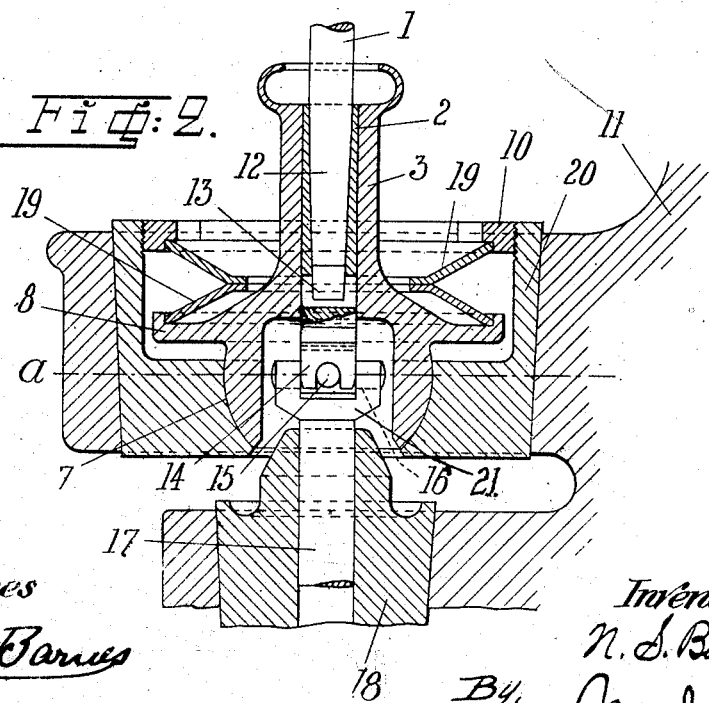
Witnesses
Inventor.

UNITED STATES PATENT OFFICE.

NILS SVENSSON BÖK, OF STOCKHOLM, SWEDEN.

JOURNALING DEVICE.

No. 878,860.

Specification of Letters Patent.

Patented Feb. 11, 1908.

Application filed July 11, 1907. Serial No. 383,287.

*To all whom it may concern:*

Be it known that I, NILS SVENSSON BÖK, a subject of the King of Sweden, and resident of Stockholm, Sweden, have invented new and useful Improvements in Journaling Devices, of which the following is a specification.

This invention relates to improvements in journaling devices for rotating and rocking shafts and more especially to an improved supporting and coupling device for such shafts.

The object of the invention is to reduce to a minimum the resistances caused by the deviations between the rocking shaft and the member supporting the same.

The invention consists, chiefly, in the combination in a journaling device for rocking shafts, of a rocking bearing-body, a non-rocking supporting member, and a shaft in said bearing-body resting on said supporting member in or near to a point coinciding with the rocking center of said bearing-body.

In the accompanying drawing forming a part of this specification Figures 1 and 2 show each an embodiment of my invention in vertical section.

Referring to Fig. 1, the pin 2 of the shaft 1 is journaled in an elastically articulated bearing-body 3. At the lower end the pin 2 has a center 4 resting on the upper end of a supporting member constituted by a pin 6 screwed into the part 5 of the frame 11. The center of the spherical rocking surface 7 of the bearing-body 3 coincides with the point where the dotted line *a—b* crosses the axis of the pin 6, and said point is also the center of the upper spherical supporting surface of the pin 6. The bearing body is provided with a flange 8 which is loaded by a spring 9, the tension of which is controlled by means of a ring-nut 10 screwed into the frame 11.

It is obvious that the rocking movements of the bearing body caused by the shaft 1 and the spring 9 cannot cause any transversal pressures on the bearing-surfaces emanating from the supporting and rocking center.

Referring to Fig. 2 in which 1, 2, 3, 7, 8, 10 and 11 indicate same or corresponding parts as the same reference numerals in Fig. 1, the upper hollow part of the pin 2 incloses the conical part 12 of the shaft 1 the lower end of which is formed as an edge 13 by means of which the shaft in the usual manner is caused to partake in the rotation of the pin 2. The lower end of the latter is double-forked, and each of the forks engages one of two pins 15 in alinement with each other, said pins being integral with and forming a cross together with two other pins 16 at right angles to the pins 15. The pins 16 are engaged by the uppermost double-forked part 21 of a supporting shaft 17 journaled in a removable bushing 18 in the frame 11. The driving power is transferred to the shaft 1 by means of the shaft 17, the cross 15, 16 and the pin 2. In as much as the axes of the pins 15 and 16 cross each other in or near to the center of the spherical rocking surface 7 of the bearing body 3, it is obvious that also here the rocking movements of the shaft 1 and the bearing-body 3 cannot cause any transversal pressures between the rotating supporting and supported parts.

Instead of the spiral spring 9 shown in Fig. 1 ring-shaped conical spring-plates 19 are used, the tension of which is controlled by means of the ring-nut 10 screwed into a removable bushing 20 inserted in the frame 11.

Having now described my invention what I claim as new and desire to secure by Letters Patent is:

1. In a journaling device for rotating and rocking shafts, the combination of a non-rocking supporting member, a body bearing and arranged to rock in said member, a shaft disposed in and arranged to rock with said bearing body, and means independent of the bearing body, for supporting said shaft in the bearing body; said means being arranged within the bearing body and in the center of the rocking movement thereof.

2. In a journaling device for rotating and rocking shafts, the combination of a non-rocking supporting member, a body bearing and arranged to rock in said member, a shaft disposed in and arranged to rock with said bearing body, means independent of the bearing body, for supporting said shaft, in the bearing body; said means being arranged within the bearing body and in the center of the rocking movement thereof, and a spring arranged between an abutment on the bearing body and an abutment on the non-rocking member, disposed above the first mentioned abutment.

3. In a journaling device for rotating and rocking shafts, the combination of a non-rocking supporting member, a body bearing and arranged to rock in said member, a shaft disposed in and arranged to rock with said bearing body, means supporting said shaft, arranged within the bearing body and in the center of the rocking movement thereof, a ring adjustable vertically in the non-rocking supporting member, and a spring arranged between said ring and an abutment on the bearing body, located below the ring.

4. In a journaling device for rotating and rocking shafts, the combination of a non-rocking supporting member, a body bearing and arranged to rock in said member and having an exterior flange, a shaft disposed in and arranged to rock with said bearing body, means supporting said shaft, arranged within the bearing body and in the center of the rocking movement thereof, a ring adjustable vertically in the non-rocking supporting member at a point above the flange on the bearing body, and a spring surrounding the bearing body and interposed between the flange thereof and the said ring.

In testimony that I claim the foregoing as my invention, I have signed my name in presence of two subscribing witnesses.

NILS SVENSSON BÖK.

Witnesses:
 EWALD DELMAR,
 JOHN DELMAR.